(12) United States Patent
Nanda et al.

(10) Patent No.: US 8,488,508 B2
(45) Date of Patent: Jul. 16, 2013

(54) METHOD AND APPARATUS FOR PROVIDING RELIABLE MULTICAST IN A WIRELESS COMMUNICATION SYSTEM

(75) Inventors: Sanjiv Nanda, Ramona, CA (US); Arnaud Meylan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 762 days.

(21) Appl. No.: 11/937,278

(22) Filed: Nov. 8, 2007

(65) Prior Publication Data

US 2008/0112350 A1 May 15, 2008

Related U.S. Application Data

(60) Provisional application No. 60/865,617, filed on Nov. 13, 2006.

(51) Int. Cl.
- H04H 20/71 (2008.01)
- H04L 12/56 (2006.01)
- H04J 3/24 (2006.01)

(52) U.S. Cl.
USPC ............ 370/312; 370/392; 370/394; 370/473

(58) Field of Classification Search
None
See application file for complete search history.

(56) References Cited

U.S. PATENT DOCUMENTS

| | | | |
|---|---|---|---|
| 7,013,157 | B1 | 3/2006 | Norman et al. |
| 7,113,773 | B2 | 9/2006 | Quick, Jr. et al. |
| 7,289,500 | B1 | 10/2007 | Amlekar |
| 7,321,582 | B2 | 1/2008 | Choi et al. |
| 7,324,545 | B2 | 1/2008 | Chuah et al. |
| 7,447,148 | B2 | 11/2008 | Gao et al. |
| 2003/0126238 | A1* | 7/2003 | Kohno et al. .......... 709/220 |
| 2007/0115905 | A1* | 5/2007 | Jokela et al. .......... 370/338 |
| 2007/0258466 | A1* | 11/2007 | Kakani ............. 370/395.53 |
| 2007/0286121 | A1* | 12/2007 | Kolakowski et al. ...... 370/329 |

FOREIGN PATENT DOCUMENTS

| | | |
|---|---|---|
| JP | 2003124875 A | 4/2003 |
| JP | 2006304294 A | 11/2006 |
| TW | 200529619 | 9/2005 |
| TW | I256796 | 6/2006 |

OTHER PUBLICATIONS

Kim, Byung-Seo, et al. OFDMA-based reliable multicasting MAC protocol for WLANs, IEEE, VT-2006-00780.R1, pp. 1-10.
Li, Z., et al. Perceived speech quality driven retransmission mechanism for wireless VoIP. The Institution of Electrical Engineers, IEE, Michael Faraday House, Six Hills Way, Stevenage, SG1 2AY, 2003, pp. 395-399.
International Search Report, PCT/US2007/084232—International Search Authority, European Patent Office—Apr. 18, 2008.
Written Opinion. PCT/US2007/084232—International Search Authority, European Patent Office—Apr. 18, 2008.
Taiwan Search Report—TW096142890—TIPO—Sep. 7, 2011.

* cited by examiner

*Primary Examiner* — Chirag Shah
*Assistant Examiner* — Ashley Shivers
(74) *Attorney, Agent, or Firm* — Donald Kordich; Mary A. Fales

(57) ABSTRACT

A method and apparatus is described which provides reliable multicasting in a WLAN. The use of at least two distinct MAC multicast addresses are used to separate the first multicast frame transmissions from subsequent multicast frame re-transmissions. Thereby enabling legacy devices to ignore duplicate retransmitted multicast frames, because the duplicate frames are sent using a multicast address they do not listen to. Thus, the legacy devices are not confused with duplicated frames. In addition, new devices benefit from the retransmissions sent on the second multicast address and can re-order the frames before delivering to the applications or upper layers; thereby improving the QoS for the multicast.

28 Claims, 5 Drawing Sheets

METHOD AND APPARATUS FOR PROVIDING RELIABLE MULTICAST IN A WIRELESS COMMUNICATION SYSTEM

CROSS-REFERENCE

This application claims the benefit of U.S. Provisional Application Ser. No. 60/865,617 filed Nov. 13, 2006, entitled "RELIABLE MULTICAST THROUGH MULTIPLE TRANSMISSIONS OF FRAME" the entirety of which is incorporated herein by reference.

BACKGROUND

1. Field

The present disclosure relates generally to wireless communications and more specifically to a method and apparatus for providing reliable multicast in a Wireless Local Area Network (WLAN).

2. Background

WLANs have become popular and are used in many homes and businesses. WLANs can be found in places like coffee shops, Internet cafes, libraries, and public/private organizations. With the increase use of WLANs, demand for broadcasting/multicasting has also steadily increased. Thus, a need exists for reliable multicasting.

Users want to be able to watch videos, receive newscasts, and other local broadcast information. A commonly used communication protocol in a WLAN is the IEEE 802.11, which has the ability to multicast by utilizing a broadcast or multicast address within the MAC layer. However, the 802.11 protocol does not support reliable multicasting, in that, the multicast frames are not acknowledged e.g. via acknowledgment (ACK) signaling and are not retransmitted.

Multicast frames are frames transmitted by an access point (AP) with the receiver address set to one of a set of broadcast or multicast addresses. A multicast address represents a group of recipients. The AP maintains only one multicast queue and associates a single sequence number space with all multicast and broadcast user data frames. When multicast frames are transmitted with no ACK policy, their frame loss rates can be quite large. A loss rate of 10% is fairly typical. Frame losses can occur not only due to the signal-to-noise ratio (SNR) distribution depending on the location of the stations (STA) within the AP coverage area (e.g., the distance of the STA from the AP), but also due to overlapping transmissions, hidden terminal problems, etc. Although the coverage can be improved by lowering the data rate chosen for the frame transmission, using a lower data rate results in the frame transmission occupying the medium for a longer duration, thus increasing the likelihood of getting interfered by an overlapping transmission. As a result, it is unlikely that the frame error rate of unacknowledged transmissions on an 802.11 WLAN can be reduced significantly. Thus, when the multicast frames are lost and the protocol does not retransmit, the service becomes unacceptable to users.

In addition, a problem occurs in legacy devices if original multicast or broadcast frames are retransmitted by the AP. A legacy device, for example, may be one that uses any 802.11 protocol not modified according to the invention described here. The problem is that in a legacy device the MAC layer will not detect the duplicates causing the upper layers to be confused by the duplicates. In other words, a legacy STA will pass the received multicasted frame up to the receiver stack to the application regardless if the legacy STA has received the same frame previously. This will cause the STA to see out of order and duplicate packets. This problem exists independent of what mechanism is introduced to cause an AP to transmit multiple copies multicast frames. Thus, there is a need to provide support for legacy STAs as well as for newer STAs that can benefit from retransmissions of the multicast or broadcast frames.

A proposed solution to these problems have been to allow full acknowledgements. Allowing full acknowledgements of the multicast frames may result in wasted bandwidth from acknowledgements transmitted by all devices subscribed to the multicast stream and increased complexity of defining a protocol to obtain acknowledgments from all devices.

In order to overcome these problems, the present disclosure proposes a solution wherein the AP can make multiple retransmissions of frames associated with a multicast stream without causing existing devices to see out-of-order and duplicate frames, while providing improved reliability for newer devices and working within the existing protocols.

Other benefits, features and advantages of the various aspects will become apparent from the following detailed description, figures and claims. It should be understood, however, that the detailed description and the specific examples, are given by way of illustration only, since various changes and modifications within the spirit and scope of the invention will become apparent to those skilled in the art from this detailed description.

SUMMARY

The following presents a simplified summary of the disclosed embodiments in order to provide a basic understanding of such embodiments. This summary is not an extensive overview of all contemplated embodiments, and is intended to neither identify key or critical elements nor delineate the scope of such embodiments. A more detailed description is presented later.

Methodologies and apparatuses are described that provide techniques for reliable multicasting in a wireless communication system.

According to an aspect of the disclosure, a method in which a multicast frame associated with a first multicast receiver address is transmitted, and a duplicate of the multicast frame associated with a second multicast receiver address is retransmitted. The second multicast receiver address is different from the first multicast receiver address.

In another aspect of the disclosure, a computer-readable medium that has code for causing a computer to transmit a multicast frame associated with a first multicast receiver address, and to retransmit a duplicate of the multicast frame with a second multicast receiver address that is different from the first multicast receiver address. In addition, the multicast receiver addressing is done via the MAC layer.

In yet another aspect of the disclosure, an integrated circuit is configured to transmit a multicast frame associated with a first multicast receiver address, and to retransmit a duplicate of the multicast frame with a second multicast receiver address that is different from the first multicast receiver address. Also, the two different multicast frames have a portion of their headers in common.

Another aspect of the disclosure, is an apparatus with means for transmitting a multicast frame associated with a first multicast receiver address, and means for retransmitting a duplicate of the multicast frame with a second multicast receiver address that is different from the first multicast receiver address.

In yet another aspect of the disclosure, a processor associated with some memory is configured to transmit a multicast frame associated with a first multicast receiver address and to retransmit a duplicate of the multicast frame with a second multicast receiver address that is different from the first multicast receiver. In addition, the multicast frame associated with the first multicast receiver address and the duplicate of the multicast frame associated with a second multicast receiver address have a portion of their headers in common.

DETAILED DESCRIPTION

Figure 1:
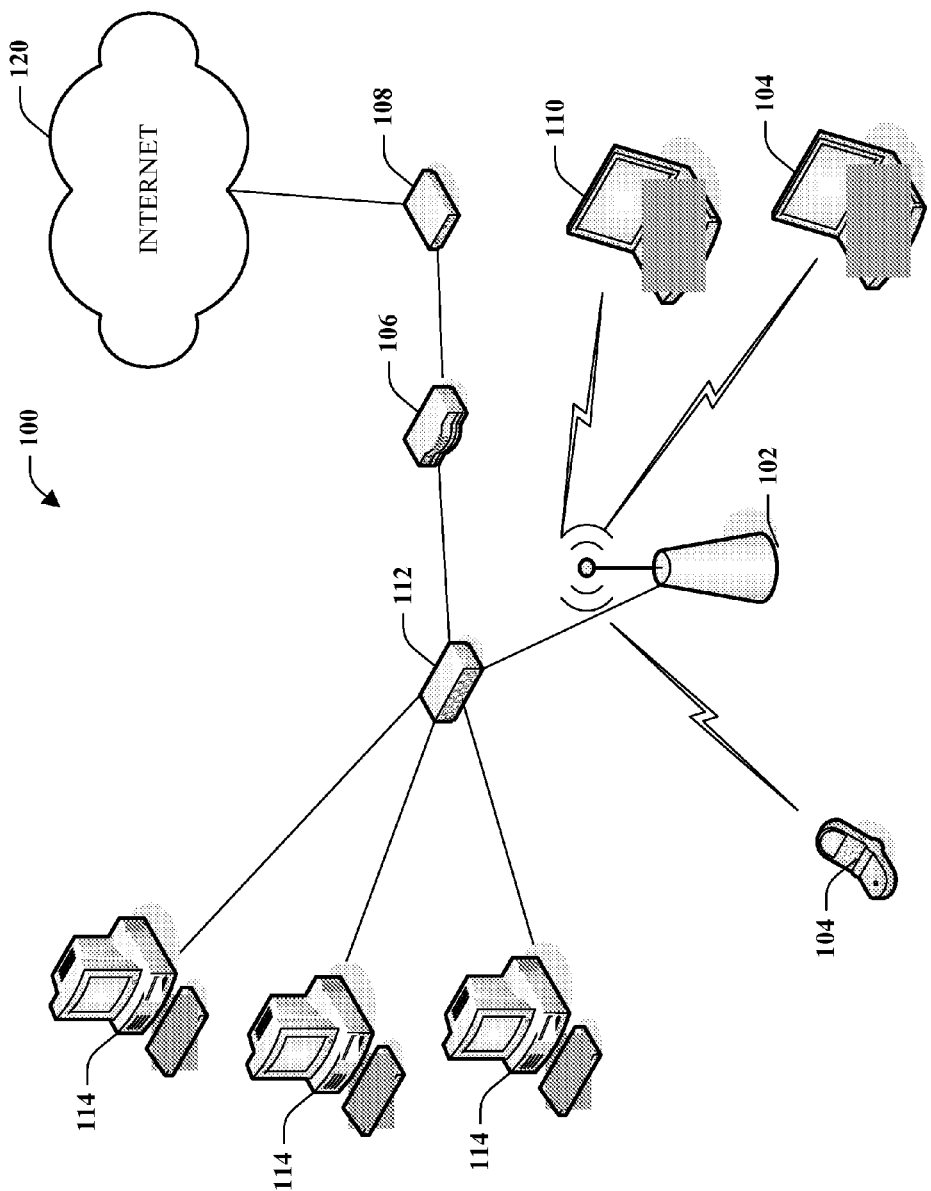
FIG. 1 illustrates an embodiment of a wireless communication system.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident; however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, an integrated circuit, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device and/or an access point. A mobile device may refer to a device providing voice and/or data connectivity to a user. A mobile device may be connected to a computing device such as a laptop computer or desktop computer, or it may be a self contained device such as a personal digital assistant (PDA). A mobile device can also be called a system, a subscriber unit, a wireless terminal, a subscriber station, mobile station, mobile, remote station, access point, remote terminal, access terminal (AT), user terminal, user agent, user device, or user equipment (UE). A mobile device may be a subscriber station (STA), wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. An access point (e.g. base station) may refer to a device in an access network that communicates over the air-interface, through one or more sectors, with mobile devices. The access point may act as a router between the mobile device and the rest of the access network, which may include an Internet Protocol (IP) network, by converting received air-interface frames to IP packets. The access point also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The word "exemplary" is used herein to mean serving as an example, instance, or illustration. Any aspect described herein as "exemplary" is not necessarily to be construed as preferred or advantageous over other aspects.

Referring now to the drawings, FIG. 1 illustrates an embodiment of a wireless communication system in which an aspect of the disclosure may be implemented on. Illustrated is a system 100 that includes a WLAN associated with a wired local area network (LAN). Access point (AP) 102 may be in communication with a newer protocol mobile device 104 and a legacy protocol device 110. Only two newer mobile devices 104 and one legacy protocol mobile device 110 are illustrated for simplicity, but many devices may be in communication with the access point 102. The access point 102 may also be referred to as a base station (BS), a Node B, a sector, or other similar terminology. Access point 102 may be connected to an Ethernet hub or switch 112 for a LAN. Ethernet hub 112 may be connected to one or more electronic devices 114 which may include personal computers, peripheral devices (e.g., facsimile machines, copiers, printers, scanners, etc.), servers, and the like. Ethernet hub 112 may be connected to a router 106 that transmits data packets to a modem 108. Modem 108 may transmit data packets to a wide area network (WAN) 120, such as the Internet. System 100 illustrates a single, simple network configuration. Many additional configurations of system 100 including alternative electronic devices may be implemented. Although system 100 has been illustrated and describe with reference to a WLAN, system 100 may also utilize other technologies including WWAN and/or WPAN either separately or concurrently.

The newer mobile device 104 may utilize newer protocols such as those described in this invention. Throughout this disclosure, a "non-legacy" mobile or device is considered to be a device that utilizes a newer protocol. The legacy protocol mobile device 110 may utilize a legacy protocol, for example, IEEE 802.11 including any of the addenda described in 802.11a, 802.11b, 802.11g, 802.11v, 802.11n, or 802.11e.

Throughout this disclosure, a legacy mobile device may also be called a legacy mobile, device, or station. Access point 102 may be broadcasting or multicasting information to the newer and legacy devices.

Figure 2:
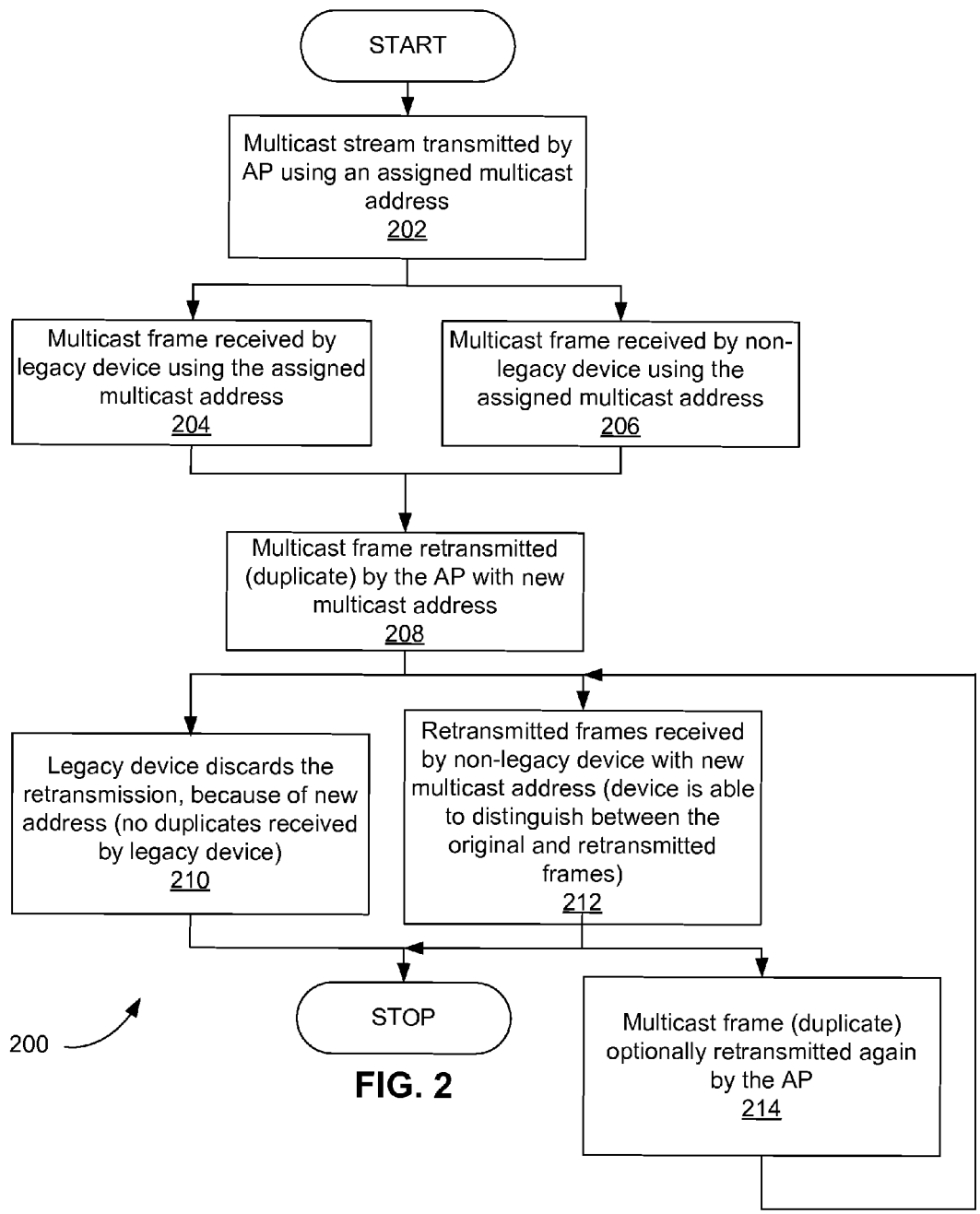
FIG. 2 illustrates a flow chart demonstrating a process according to an aspect of the disclosure.

FIG. 2 illustrates a flow chart demonstrating a process 200 according to an aspect of the disclosure. In this exemplary process 200, an access point 102 (such as described in FIG. 1) is multicasting to a newer 104 and a legacy 110 device. Starting at step 202, a multicast stream is transmitted by an access point using an assigned multicast address. The 802.11 standard allows multicast and broadcast addressing in the MAC layer. For example, the 802.11 MAC layer has four address fields defined in the MAC frame format. The fields are used to indicate: the source address, the destination address, the transmitting station address, and the receiving station address. The destination address may be used to address an individual or a group. In addition to the address fields, the 802.11 protocol has a sequence field that may be used to request retransmission of a unique frame or to organize the original and retransmitted frames to keep them in order. Since broadcast and multicast frames are not retransmitted in the existing 802.11 protocols, legacy devices ignore the sequence field in broadcast and multicast frames. Referring to a data frame for the 802.11, address one (1) typically contains the destination address which may be used for an individual or group. Address two (2) typically identifies the transmitting station. Thus, using the 802.11 example, at step 202, the access point may send out a multicast address in address one (1) of the data frame. A non-legacy and a legacy device may have subscribed to that multicast group and therefore will receive the frame. At step 204, the legacy device receives the multicast frame. In conjunction, at step 206, the non-legacy mobile device receives the multicast frame. Currently in 802.11, multicast frames are not acknowledged (ACKed) or retransmitted. An aspect of the disclosure is to retransmit the multicast frames so that the devices may benefit from the retransmission in the event of a lost frame. Degradation of the quality of service (QoS) happens when the frame loss rate is not zero. If the frame loss rate is high enough, the multicast service may be inoperable. By retransmitting multicast frames the problems associated with frame loss rates are solved. However, if the access point retransmits the frames using the same multicast address, then a problem occurs within legacy devices. The legacy protocols do not support frame sequencing and duplicate detection for multicast and broadcast frames. As a result, when the legacy device receives a duplicate retransmitted multicast or broadcast frame it will pass the frame up to the application or upper layers as if it was a new original frame being received. This causes confusion at the applications running on the legacy device and unsatisfactory service to the end user. Thus, an aspect of the disclosure is to provide a second multicast address that is different from the first multicast address which will enable the legacy device to discard the retransmitted duplicate frames as belonging to a multicast stream to which it is not subscribed thereby solving the problem of the legacy devices being confused by duplicate retransmitted frames. At step 208, the access point retransmits a duplicate frame at the next interval using a second multicast address. The second multicast address is different from the first address. In the case of a broadcast stream which has a unique broadcast address, the access point may use a specific multicast address assigned for the duplicate transmissions of broadcast frames. At step 210, the legacy device does not recognize the second multicast address as one to which it is subscribed and discards the duplicate retransmitted frame and the process ends for the legacy device. In parallel, with step 210, at step 212, the non-legacy device receives the retransmitted frames and is able to distinguish the duplicate frame from the original as a retransmission of the original and belonging to the same multicast stream. The process may end for the non-legacy device at this point, or in an optional aspect of the disclosure proceed to step 214. At step 214, the access point may retransmit the duplicate multicast frame again. The non-legacy device may use the sequence number of the retransmitted frame to distinguish when more than one instance of a retransmitted frame is received for a given second multicast address. In an optional aspect of the disclosure, the access point may use a third multicast address or again use the second multicast address for the retransmissions. Another optional aspect of the disclosure is that the access point may set a threshold or limit for the total number of times the frames could be retransmitted. For example, the access point may set the threshold to four (4), therefore the steps 210, 212 and 214 may be repeated until the threshold of four (4) is met. Another optional aspect of the disclosure is for at least one of the devices from the multicast group to send a feedback message back to the access point thereby assisting the access point in determining the number of retransmissions required.

Figure 3:
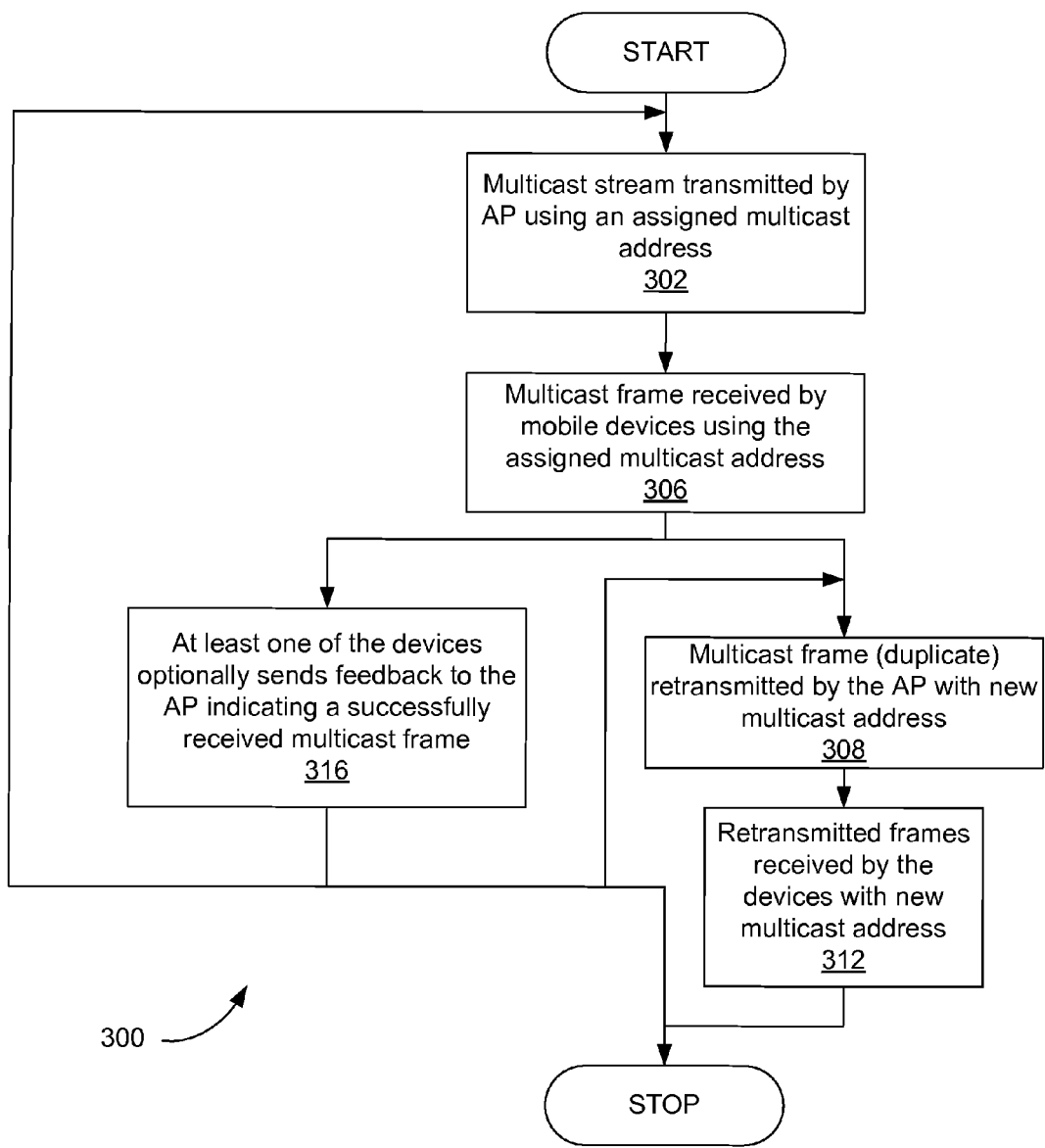
FIG. 3 illustrates a flow chart demonstrating a process according to an aspect of the disclosure that can utilize ACK, feedback, or Block ACK messages.

FIG. 3 illustrates a flow chart demonstrating a process 300 according to an aspect of the disclosure that can utilize ACK, feedback, or Block ACK messages. At step 302, an access point transmits a multicast frame using an assigned multicast address. The multicast frame is received by a group of devices at step 306. At step 316, in an optional aspect of the disclosure, at least one of the newer devices in the multicast group sends an ACK or feedback message back to the access point indicating that the transmitted multicast frame is successfully received. Another optional aspect is that a subset of the multicast group may also send a Block ACK message back to the access point indicating their status of the transmitted multicast frame, in conjunction, the process may proceed to step 308. The ability to send ACKs or feedback of the multicast transmissions may be statically or dynamically assigned. For example, a mobile device may be designated to send ACKs depending on its location within the WLAN. Over time, the AP uses the statistics of received ACKs and lost frames to adapt the number of retransmissions to use for the multicast stream.

The subset group may be non-legacy or legacy devices. In large multicast groups it is desirable to collect statistics from only a subset of the stations in order to reduce overhead and avoid wasting system resources. By allowing only a subset of the devise to send feedback this may allow premium services for selected devices. For example, devices that may pay more for a higher quality of service may be a device that is allowed to send feedback thereby influencing the retransmissions of the AP.

The ability to send feedback may be statically or dynamically assigned. For example, a mobile device may be configured to send an ACK, feedback, or Block ACK depending on its location within the WLAN. Further the AP may optionally schedule the selected stations in order to collect their feedback with the Power Save Multi Poll (PSMP) frame defined in 802.11n. The PSMP frame may be used to announce the multicast transmission and then reserve specific medium time for selected stations to transmit their feedback, which may be a Block ACK. After the feedback is sent at step 316, the process may proceed back to step 302 where the access point transmits the frame using the original assigned multicast address, the process may end, or proceed to step 308. At step 308, the multicast frame is retransmitted using a second or new multicast address. The process proceeds to step 312 where the retransmit (duplicate) multicast frame is received by the devices. The process may end or optionally proceed back to step 308. Combinations of various optional aspects are possible. For example, the aspect of using a second multicast frame address may be combined with the optional aspect to allow a subset of devices to send Block ACKs. The optional aspect of using a separate multicast address per retransmitted frame may also be combined. Furthermore, determining when to send the retransmitted frames is determined based on the protocol, system, and other network factors. Using the 802.11 example, the retransmitted frames may be retransmitted on the next beacon interval. A beacon interval represents the number of time units between target beacon transmission times. However, the retransmitted frames may be retransmitted on the next or upcoming frames, superframes, time slots, etc. Over time, the AP can use the statistics of successful and lost frames fed back by the subset of stations to adapt the number of retransmissions to use for the multicast stream.

Figure 4:
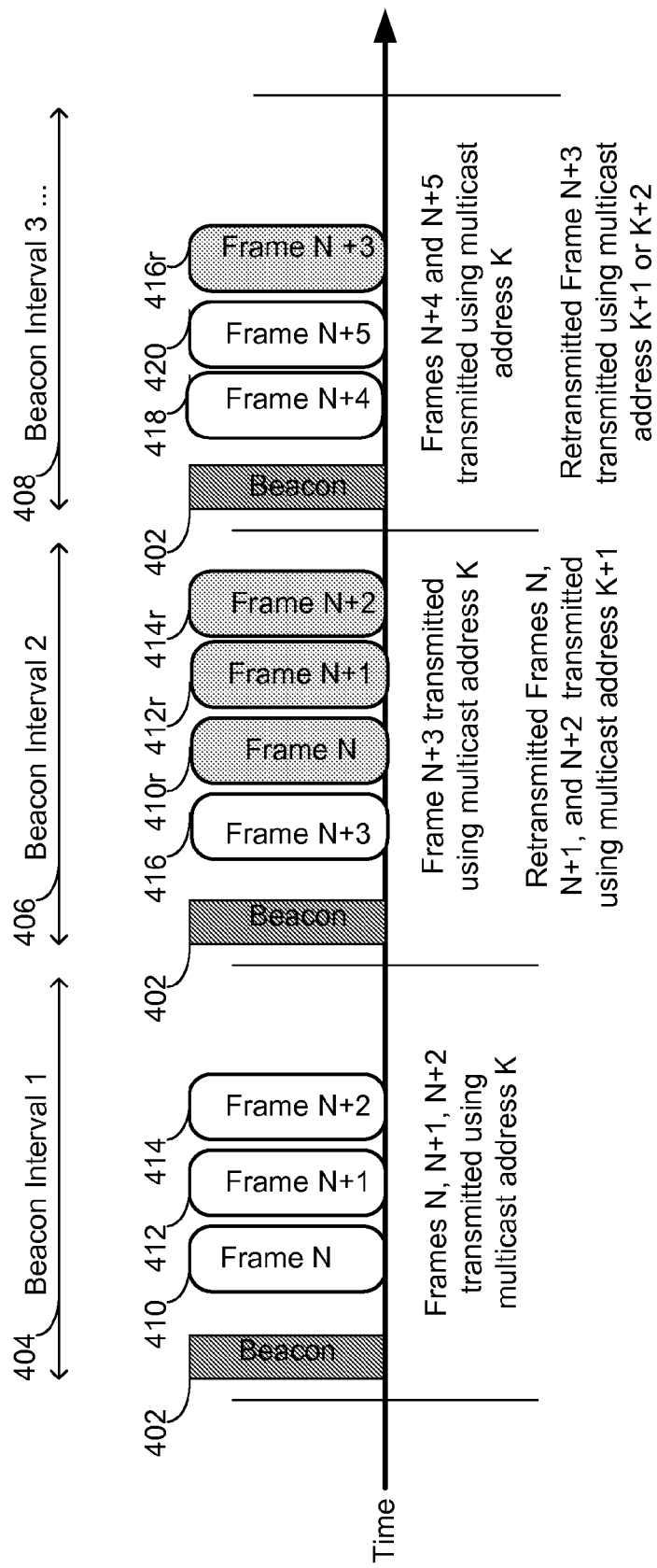
FIG. 4 illustrates an embodiment in which the timing and addressing of the retransmissions is demonstrated.

FIG. 4 illustrates an embodiment in which the timing and addressing 400 of the retransmissions is demonstrated. The processes 200 and 300 described above may use the timing and addressing 400 as illustrated in FIG. 4. For simplicity, the time line is divided into three (3) beacon intervals: beacon interval one (1) 404, beacon interval two (2) 406, and beacon interval three (3) 408. Beacons 402 are shown to be transmitted within the beacon intervals. Referring back to the process 200 in FIG. 2, at step 202 an access point transmits a multicast frame using an assigned multicast address. In regards to FIG. 4, this multicast address is called K. In the case of broadcast frames, K may represent the unique broadcast address. Frames (N) 410, (N+1) 412, and (N+2) 414 are transmitted by the access point using multicast address K during beacon interval one (1) 404. Proceeding to steps 204 and 206, the multicast frames are received by both legacy and non-legacy devices. Then at step 208, the access point retransmits a duplicate frame. In reference to FIG. 4, this duplicate retransmitted frame is given a new multicast address called K+1. For the case of broadcast frames, instead, a specific multicast address K* is assigned for this purpose. For illustration, the retransmissions are shown to be transmitted in a subsequent beacon interval. There is a tradeoff between latency requirements of multicast and broadcast streams, and power management at devices subscribed to multicast and broadcast streams. Broadcast and multicast transmissions for legacy devices always follow the beacon to allow power-save devices to sleep during the inter-beacon period. For newer devices this restriction may not apply and retransmissions of multicast and broadcast frames may be scheduled within the inter-beacon period, if desired. Depending on the latency requirement of the multicast stream, the retransmissions with multicast address K+1 may be transmitted immediately after the initial transmission with multicast address K. Power-save considerations may still prefer broadcast and multicast frame transmissions to follow beacons. Thus, during beacon interval two (2) 406, frame (N+3) 416 is transmitted using the multicast address K and duplicate frames (N) 410r, (N+1) 412r, and (N+2) 414r are retransmitted using the second or new multicast address K+1. The process continues to transmit the original multicast frames using the first multicast address K and retransmitted frames using the second or new address K+1. For this example, during beacon interval three (3) 408, the frames (N+4) 418 and (N+5) 420 are transmitted using the multicast address K. While frame (N+3) 416r is retransmitted using the second or new multicast address K+1. Many different timing and address combinations may be devised. For example, during beacon interval three (3) 408 a third or new multicast address K+2 could be used to retransmit the duplicate frames. The retransmitted frames may be retransmitted on the next beacon or time interval or on an upcoming beacon or time interval. The frames may be transmitted sequentially in time, at intervals, or randomly. Furthermore, different amounts and combinations of original and retransmitted frames may be sent during the beacon intervals. Also, the retransmitted frames may continue to be retransmitted until a threshold is reached. Referring to the optional step 316 in FIG. 3 in which at least one of the devices may send a feedback or a subset of the devices sends a block ACK back to the access point, the frames could be retransmitted within a particular beacon interval or with predetermined timing pattern. The scheduling illustrated in FIG. 4 is for exemplary purposes to explain the concept of the aspect of the disclosure with regards to how a WLAN may schedule the retransmissions using the different multicast addresses. Different scheduling combinations may be devised, and may be dependent on factors such as the protocol being used, the system, loading, etc. Thus, this illustration is not intended to be limited to the example illustrated herein. Access point 102 as described above may be an access point 500 as illustrated in FIG. 5.

Figure 5:
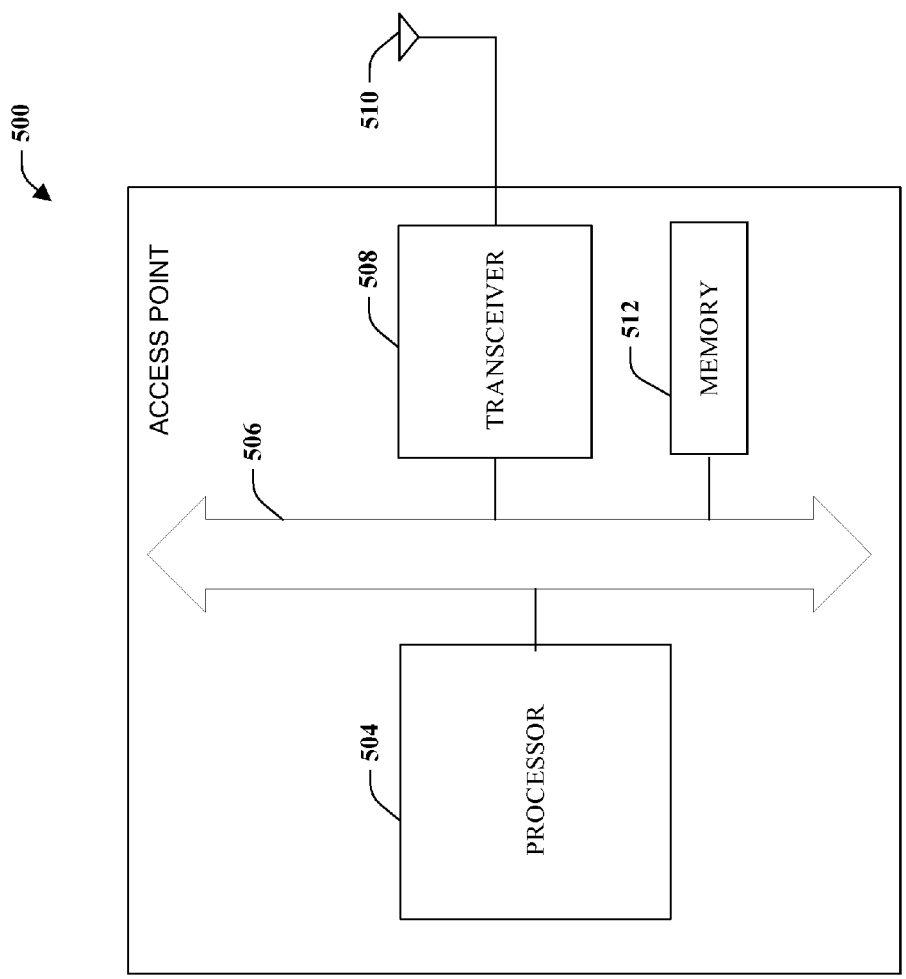
FIG. 5 illustrates a simplified block diagram according to an aspect of the disclosure.

FIG. 5 illustrates a simplified block diagram according to an aspect of the disclosure. Access point 500 comprises an antenna 510, a transceiver component 508, a memory component 512, a bus 506, and a processor 504. The access point 500 may include a WWAN (e.g., Code-Division Multiple Access (CDMA), Wideband Code-Vision Multiple Access (WCDMA), or Orthogonal Frequency Division Multiple Access (OFDMA)), WLAN (e.g., IEEE 802.11) and/or related technologies.

In an aspect, the processor 504 may provide WLAN functionality and be capable of communication with the transceiver 508 and the memory 512 through the bus 506 or other structures or devices. The processor 504 may utilize the processes described above in FIGS. 2 and 3. For example, the processor 504 may be configured to transmit a multicast frame associated with a first multicast receiver address to legacy and non-legacy devices within the WLAN, and be configured to retransmit a duplicate of the multicast frame using a second multicast receiver address different from the first multicast receiver address. It should be understood that communication means other than busses may be utilize with the disclosed aspects. Transceiver 508 is coupled to one or more antennas 510 to allow transmission and/or reception by the access point 500. Processor 504 may generate voice data provided to transceiver 508 for communication. In an aspect, the processor 504 may be included in a processor. In another aspect, the processor 504 may be provided by distinct integrated circuits. In another aspect, the processor 504 may communicate and work in corporation with a processor. In a further aspect, the processor 504 may be provided by one or more integrated circuits, processors, ASICs, FPGAs, combinations thereof, or the like including functionality.

Those skilled in the art would further appreciate that the various illustrative logical blocks, modules, and steps described in connection with the aspects disclosed herein may be implemented as hardware, software, firmware, or any combination thereof and hardware implementation may be digital, analog or both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

The various illustrative logical blocks, and modules described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, an integrated circuit, one or more microprocessors in conjunction with a DSP core, or any other such configuration.

An exemplary storage medium is coupled to the processor such the processor could read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The steps or functions of a method or algorithm described in connection with the aspects disclosed herein may be embodied directly in hardware, in software executed by a processor, or in a combination of the two. The steps or functions could be interchanged without departing from the scope of the aspects.

If the steps or functions are implemented in software, the steps or functions may be stored on or transmitted over as one or more instructions of code on a computer-readable medium. Computer-readable media includes both computer storage media and communication media including any media that facilitates transfer of a computer program from one place to another. A storage media may be any available media that could be assessed by a general purpose or special purpose computer. By way of example, and not limitation, such computer-readable media could comprise RAM, flash memory, ROM, EPROM, EEPROM, registers, hard disk, a removable disk, a CD-ROM, optical disk storage, magnetic disk storage, magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source, using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically. A computer program product would also indicate materials to package the CD or software medium therein. Combinations of the above should also be included within the scope of computer-readable media.

The previous description of the certain aspects is provided to enable any person skilled in the art to make or use the invention. Various modifications to these aspects will be readily apparent to those skilled in the art, and the generic principles defined herein may be applied to other aspects without departing from the scope of this disclosure. Thus, this disclosure is not intended to be limited to the aspects shown herein but is to be accorded the widest scope consistent with the principles and novel features disclosed herein.

What is claimed is:

The invention claimed is:

1. A method for reliable multicasting in a wireless communication system, comprising:
   transmitting a multicast frame having a header and addressed to a first multicast receiver address, wherein the first multicast receiver address maps to a first set of wireless devices and to a second set of wireless devices within a network area; and
   retransmitting a duplicate of the multicast frame addressed to a second multicast receiver address different from the first multicast receiver address, wherein the second multicast receiver address is signaled to at least one device of a multicast group, further wherein the second multicast receiver address maps to the first set of wireless devices and not to the second set of wireless devices, further comprising receiving a feedback associated with the multicast frame from at least one device of the multicast group, wherein the received feedback determines the number of duplicate retransmissions of the multicast frame, and wherein the duplicate retransmissions of the multicast frames use a sequence number of the retransmitted frames to distinguish multiple instances of retransmitted frames up to a threshold, and wherein the feedback is collected from a selected subset of one or more devices in the multicast group dynamically assigned on the basis of location within the network area.

2. The method of claim 1, wherein the feedback comprises an ACK message.

3. The method of claim 1, wherein the feedback comprises a block ACK message.

4. The method of claim 1, further comprising:
   scheduling the feedback based upon Power Save Multi Poll (PSMP).

5. The method of claim 1, wherein the multicast frame associated with the first multicast receiver address and the duplicate of the multicast frame associated with a second multicast receiver address have a portion of their headers in common.

6. The method of claim 5, wherein the portion of their headers in common is a sequence number.

7. The method of claim 5, further comprising:
   receiving the multicast frame and the duplicate frame on a non-legacy device, wherein the non-legacy device detects the duplicate frame based upon the frame headers.

8. The method of claim 5, further comprising:
   receiving the multicast frame and the duplicate frame on a legacy device, wherein the legacy device discards the duplicate frame based upon the frame headers.

9. The method of claim 8, wherein the legacy device utilizes a protocol selected from the group consisting of: IEEE 802.11, IEEE 802.11a, IEEE 802.11b, IEEE 802.11g, IEEE 802.11e, IEEE 802.11v, and IEEE 802.11n.

10. The method of claim 1, further comprising:
    setting a threshold for a number of retransmissions for the multicast frame, wherein the retransmitting the duplicate of the multicast frame repeats until the threshold is met.

11. The method of claim 1, further comprising:
retransmitting the duplicate frames on an upcoming beacon interval; and
using a unique multicast address for the retransmissions in each beacon interval.

12. The method of claim 1, wherein the multicast receiver addressing is performed via a MAC layer.

13. The method of claim 1, wherein the multicast frame is transmitted among a particular sequence of frames.

14. An article comprising:
a non-transitory computer-readable medium having instructions stored thereon that are executable by a processor to:
initiate transmission of a multicast frame having a header and addressed to a first multicast receiver address, wherein the first multicast receiver address maps to a first set of wireless devices and to a second set of wireless devices within a network area; and
initiate retransmission of a duplicate of the multicast frame addressed to a second multicast receiver address different from the first multicast receiver address, wherein the second multicast receiver address is signaled to at least one of a multicast group, and further wherein the multicast receiver addressing is performed via a MAC layer, the second multicast receiver address being mapped to the first set of wireless devices and not to the second set of wireless devices, further comprising receiving feedback associated with the multicast frame from at least one device of the multicast group, wherein the received feedback determines the number of duplicate retransmissions of the multicast frame, and wherein the feedback is collected from a selected subset of one or more devices in the multicast group dynamically assigned on the basis of location within the network area, and wherein the duplicate retransmissions of the multicast frames use a sequence number of the retransmitted frames to distinguish multiple instances of retransmitted frames up to a threshold.

15. The article of claim 14, wherein the feedback comprises an ACK message.

16. The article of claim 14, wherein the feedback comprises a block ACK message.

17. The article of claim 14, further comprising:
the instructions executable to schedule the feedback based upon Power Save Multi Poll (PSMP).

18. The article of claim 14, wherein the multicast frame associated with the first multicast receiver address and the duplicate of the multicast frame associated with a second multicast receiver address have a portion of their headers in common.

19. The article of claim 18, wherein the portion of their headers in common is a sequence number.

20. An integrated circuit, comprising circuitry to:
transmit a multicast frame having a header and addressed to a first multicast receiver address, wherein the first multicast receiver address maps to a first set of wireless devices and to a second set of wireless devices within a network area; and
retransmit a duplicate of the multicast frame addressed to a second multicast receiver address different from the first multicast receiver address, wherein the second multicast receiver address is signaled to at least one of a multicast group, and further wherein the multicast frame associated with the first multicast receiver address and the duplicate of the multicast frame associated with a second multicast receiver address have a portion of their headers in common, the second multicast receiver address being mapped to the first set of the wireless devices and not to the second set of wireless devices, further comprising receiving feedback associated with the multicast frame from at least one device of the multicast group, wherein the received feedback determines the number of duplicate retransmissions of the multicast frame, and wherein the duplicate retransmissions of the multicast frames use a sequence number of the retransmitted frames to distinguish multiple instances of retransmitted frames up to a threshold, and wherein the feedback is collected from a selected subset of one or more devices in the multicast group dynamically assigned on the basis of location within the network area.

21. The integrated circuit of claim 20, wherein the feedback comprises an ACK message.

22. The integrated circuit of claim 20, wherein the feedback comprises a block ACK message.

23. The integrated circuit of claim 20, further comprising:
the circuitry configured to schedule the feedback based upon Power Save Multi Poll (PSMP).

24. The integrated circuit of claim 20, wherein the multicast frame associated with the first multicast receiver address and the duplicate of the multicast frame associated with a second multicast receiver address have a portion of their headers in common.

25. The integrated circuit of claim 24, wherein the portion of their headers in common is a sequence number.

26. An apparatus for reliable multicasting in a wireless communication system, comprising:
a processor configured to transmit a multicast frame having a header and addressed to a first multicast receiver address, wherein the first multicast receiver address maps to a first set of wireless devices and to a second set of wireless devices within a network area, and to retransmit a duplicate of the multicast frame, the duplicate being associated with a second multicast receiver address different from the first multicast receiver address, wherein the second multicast receiver address is signaled to at least one device of a multicast group, and further wherein the second multicast receiver address maps to the first set of the wireless devices and not to the second set of wireless device, and the processor further configured to receive a feedback associated with the multicast frame from at least one device of the multicast group, wherein the received feedback determines the number of duplicate retransmissions of the multicast frame, and wherein the feedback is collected from a selected subset of one or more devices in the multicast group dynamically assigned on the basis of location within the network area, and wherein the duplicate retransmissions of the multicast frames use a sequence number of the retransmitted frames to distinguish multiple instances of retransmitted frames up to a threshold, the multicast frame associated with the first multicast receiver address and the duplicate of the multicast frame associated with a second multicast receiver address having a portion of their headers in common; and
a memory associated with the processor.

27. The apparatus of claim 26, wherein the processor is further configured to receive a feedback associated with the multicast frame from at least one device of the multicast group, wherein the received feedback determines the number of duplicate retransmissions of the multicast frame.

28. The apparatus of claim 26, wherein the processor is further configured to set a threshold for a number of retransmissions for the multicast frame, wherein the retransmitting the duplicate of the multicast frame repeats until the threshold is met.

* * * * *